March 3, 1959

L. H. FLORA 2,875,805

MOUNTING RETAINER HAVING RAISED FLANGES
TO ENGAGE HEAD OF STUD

Filed Nov. 16, 1956

INVENTOR.
Laurence H. Flora
BY
Bates, Teare & McBean
ATTORNEYS

United States Patent Office 2,875,805
Patented Mar. 3, 1959

2,875,805

MOUNTING RETAINER HAVING RAISED FLANGES TO ENGAGE HEAD OF STUD

Laurence H. Flora, North Olmsted, Ohio, assignor to Tinnerman Products Inc., Cleveland, Ohio, a corporation of Ohio Application November 16, 1956, Serial No. 622,571

2 Claims. (Cl. 151—41.76)

This application relates to a fastening device for holding a plastic nut or the like and more particularly to a fastening device in which a plastic nut may be quickly and easily inserted by hand and securely retained therein without the use of special tools or equipment.

One type of fastener heretofore used for receiving plastic nuts or the like comprised an L-shaped clip wherein one of the legs of the L included a flat rectangular surface having an aperture disposed substantially centrally therein which was adapted to receive a plastic nut. When the plastic nut was positioned in the aperture, tangs or projections on the sides of the rectangular surface were bent up and over the head of the nut by means of pliers or the like, thereby permanently retaining the nut in the clip. The plastic nut included a shank portion adapted for insertion through the aperture, and a rectangular head portion adapted to engage the top surface of the clip rectangular surface in such manner that the head was disposed beneath the lugs on the clip after they were bent into locking position.

A typical application of a fastening device of this nature is the supporting brackets for an automobile head lamp. Each head lamp has a plurality of mounting brackets extending outwardly from the sides thereof. Each of these mounting brackets has a slot which is adapted to be inserted into a mating circumferential groove in a bolt, which, in turn, is secured to a plastic nut in a fastening device or clip as described above, the fastening device being mounted on the car. One of the difficulties with a fastening device of this type is the fact that the plastic nut cannot be inserted or removed from the bracket without the use of special tools and without removing the device from the head lamp assembly. Such construction unnecessarily complicates the assembly of the device and renders it difficult to replace the nut in the field when it becomes worn out.

It is an object of the present invention to provide a fastening device in which a plastic nut may be inserted and retained permanently therein without the use of special tools and equipment and without removing the device from its mounting.

Another object of the present invention is to provide a fastening device for a headlamp assembly, wherein a plastic nut may be manually inserted in or removed from the device simply and quickly without removing the same from the headlamp assembly.

A further object of the present invention is to provide a fastening device in which a plastic nut or the like may be manually inserted in the device without removing the same from the object it is mounted on and which is characterized by simple construction, economy of manufacture and a minimum of parts therein.

Briefly, the foregoing objects are accomplished by the provision of a fastening device comprising a substantially L-shaped clip, wherein one of the legs of the L may comprise a bracket element having one or more apertures adapted to receive bolts or the like therein by means of which the clip may be mounted on an object. The other leg of the clip may comprise a stud receiving element including a substantially rectangular plane having a stud receiving aperture disposed substantially centrally therein and adapted to receive a plastic mounting stud or nut or the like. The sides of the rectangular surface may be formed of retaining tabs which are bent up and over the head of the stud or nut to retain the same in position in the clip. The portion of the stud receiving aperture adjacent the outer edge of the stud receiving element forms into a wedge-shaped slot, which expands outwardly from the aperture to the outer edge of the rectangular plane. The width of the junction point formed by the slot and the aperture is slightly less than the width of the plastic stud or nut shank, thereby enabling the stud or nut to be easily inserted into the slot and forced past the junction point into the aperture. This construction, along with the retaining tabs, serves to retain the stud or nut securely in position in the clip. At the same time however, the stud or nut may be quickly and simply removed from the clip if desired.

As a modification to the above fastening device, the stud receiving element thereof may comprise a rectangular plane having an aperture disposed substantially centrally therein adapted for receiving a plastic nut. As in the previous structure, the sides of the rectangular surface may be formed of retaining tabs to retain the stud in place. However in the present modification, the tabs are formed with upwardly and outwardly projecting wings formed to receive the blade of a screwdriver thereunder to bend the tabs up and away from the stud to permit removal of the same from the clip if desired. As a further modification, and in place of the wings afore-described, the tabs may have a raised shell portion on the upper surface of the closed tab adapted to receive the blade of a screwdriver thereunder to bend the tabs up and away from the stud to permit its removal from the clip.

Other objects and advantages of the invention will be further understood from the following description taken in conjunction with the drawings in which.

The present invention is directed to a fastening device constructed for manually receiving a plastic nut or the like securely therein, the device being mountable on a panel whereby the nut is held by the device in spaced relationship with respect to the panel, the plastic nut, in turn, being adapted to retain a threaded stud or the like therein.

Figure 1:
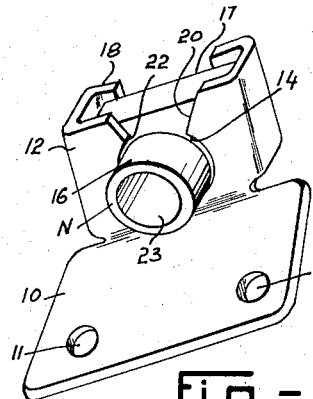
Fig. 1 is a perspective view of a fastening device constructed in accordance with the present invention and showing a plastic nut mounted therein.

Referring to Fig. 1, there is shown a fastening device in the form of a substantially L-shaped clip or support C, wherein one of the legs of the L comprises a mounting or bracket element 10 and the other leg of the L comprises a rectangular plane or stud receiving portion 12.

The bracket element 10 comprises a planular surface having means enabling the bracket element to be mounted on an object, as for example the apertures 11 which are adapted for receiving a mounting stud or rivet 13 (Figs. 3, 4, and 5) therethrough by means of which the clip may be mounted on the panel P.

The stud receiving portion or rectangular plane 12 of the clip has an aperture 14 (Figs. 1 and 2) disposed substantially centrally therein, which is adapted to receive a plastic stud or nut N or similar object therein. The stud or nut N includes a hollow shank portion 16 adapted for insertion into the aperture 14 and a head portion 17, which engages the top surface of the plane 12. Disposed on the sides of the rectangular plane 12 are the retaining tabs or arms 18 (Fig. 4), which extend up and over the stud head 17 and prevent the stud from being displaced upwardly in the aperture 14. The portion of the aperture 14 adjacent the outer edge of the rectangular plane 12 forms into a wedge shaped or tapered slot 20 (Fig. 2), which expands outwardly from the aperture to the outer edge of the plane, said slot and aperture thus forming a keyhole configuration. The width of the junction point 22 formed by the slot 20 and the aperture 14 is slightly less than the outside diameter of the nut shank 16, thereby enabling the plastic nut (the shank of which is partially elastic) to be easily inserted by hand into the slot 20 and forced past the junction point 22 and into position in the aperture 14.

Figure 3:
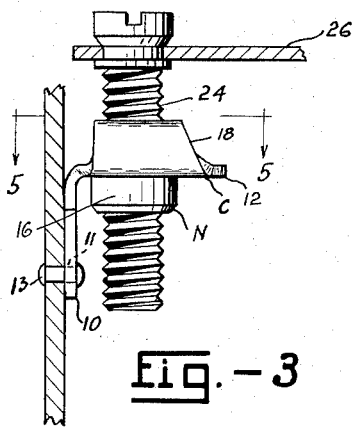
Fig. 3 is a side elevational view of a mounting assembly using the fastening device shown in Fig. 1. In this view, the panel and mounting bracket are shown in section.
Figures 2, 5, 6:
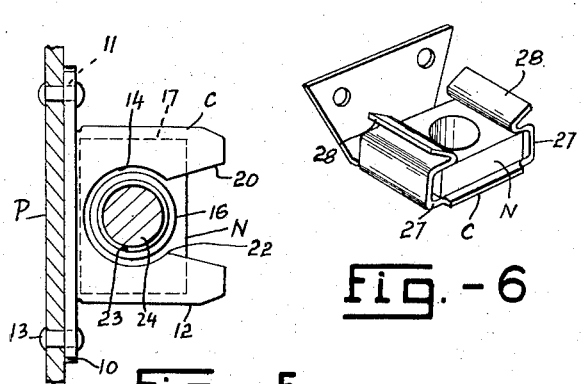
Fig. 2 is a bottom view of the fastening device shown in Fig. 1, but showing the plastic nut only partially inserted into the device.
Fig. 5 is a top view taken along the line 5—5 of Fig. 3.
Fig. 6 is a perspective view of a fastening device illustrating a modification of the invention.
Figure 4:
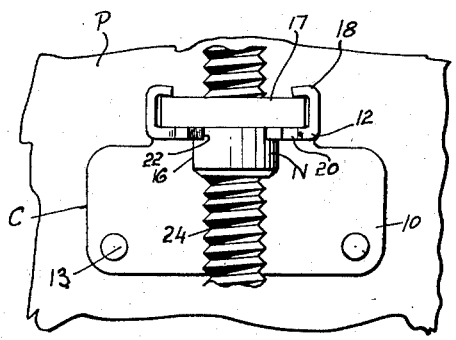
Fig. 4 is a front elevational view of the mounting assembly shown in Fig. 3, but with the head of the bolt and mounting bracket thereon removed.

A typical mounting assembly using the clip C is shown in Figs. 3, 4 and 5 wherein the clip is mounted on the panel P (which may be an automobile housing) by the rivets 13. Disposed in the aperture 23 (Fig. 5) of the plastic nut N is a threaded stud 24 containing a bracket 26 (Fig. 3), which may be an automobile head lamp bracket. Once the clip C is mounted on the panel P, the plastic nut may be manually positioned in the clip by sliding it past the junction point 22 and into the aperture 14 as aforedescribed. The nut may be just as easily removed from the clip by reversing this procedure.

A modification of the invention is shown in Fig. 6, wherein after the plastic nut is inserted in the clip C it is retained therein solely by the arms or tabs 27 which are bent up and over the head of the nut. The tabs 27 have upwardly and outwardly extending wing portions 28 formed on the upper edge of the tabs and are adapted for receiving a tool such as the blade of a screwdriver or the like thereunder or they may be grasped by pliers by means of which the tabs may be bent back to permit removal of the nut from the clip.

Figure 7:
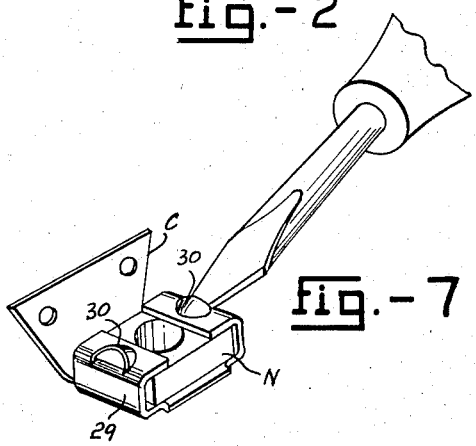
Fig. 7 is a perspective view of a fastening device illustrating a further modification of the invention.

A further modification is shown in Fig. 7 wherein the tabs 29 have raised pocket or shell portions 30, adapted to receive the blade of a screwdriver thereunder by means of which the tabs may be bent back or forth.

A particular advantage of the invention is the fact that plastic nut N may be inserted on or removed from the clip C without the necessity of removing the clip from the panel P. This construction greatly simplifies the operation of replacing the stud and of replacing the bracket or part 26 when required.

The terms and expressions which have been employed are used as terms of description and not of limitation, and there is no intention in the use of such terms and expressions, of excluding any equivalents of the features described or claimed.

I claim:

1. A fastening device comprising, an integral member of resiliently flexible material having a stud receiving portion and a mounting portion, said stud receiving portion having planular base and a pair of raised flanges at opposed marginal edges, said base having a substantially centrally located aperture and having a cut-out portion extending from the aperture to one unflanged edge of the base to guide the shank of a stud into said aperture, said flanges having inwardly directed edges overlying and parallel to the plane of said base for receiving and retaining the head of the stud therein, said cut-out portion diverging outwardly towards said one unflanged edge from an open dimension at the aperture less than the diameter of the aperture and of the stud shank for coaction with said flanged edges to retain the stud in operative position within the aperture, and said mounting portion having a planular member extending integrally from the other unflanged edge of the stud receiving portion and in a direction away from the area occupied by the stud, the planular member of said mounting portion having means thereon for mounting the fastening device on a panel.

2. In combination with a resiliently flexible stud having a tubular shank and a head, a fastening device having a stud receiving portion and a mounting portion, said stud receiving portion having a planular base and a pair of raised flanges at opposed marginal edges, said base having a substantially centrally located aperture and having a cut-out portion extending from the aperture to one unflanged edge of the base to guide the shank of the stud into said aperture, said flanges having inwardly directed edges overlying and parallel to the plane of said base for receiving and retaining the head of the stud therein, said cut-out portion diverging outwardly towards said one unflanged edge from an open dimension at the aperture less than the diameter of the aperture and of the stud shank for coaction with said flanged edges to retain the stud in operative position within the aperture, and said mounting portion having a planular member extending integrally from the other unflanged edge of the stud receiving portion and away from interference with the stud, said planular member having spaced apertures adapted to mount the fastening device on panel supports.

References Cited in the file of this patent

UNITED STATES PATENTS

| 2,330,372 | Mittendorf | Sept. 28, 1943 |
| 2,649,126 | Tinnerman | Aug. 18, 1953 |
| 2,748,906 | Flora | June 5, 1956 |

FOREIGN PATENTS

| 587,783 | Great Britain | May 6, 1947 |
| 745,788 | Great Britain | Feb. 29, 1956 |